Jan. 17, 1956

J. E. McELLIGOTT 2,731,576

6-PHASE, 2-CIRCUIT GENERATORS

Filed Oct. 18, 1954

INVENTOR.
John E. McElligott

BY
Smith, Olsen, Baird & Gulbrandsen
Attys.

INVENTOR.
John E. McElligott
BY
Smith, Olsen, Baird & Gulbrandsen
Attys.

United States Patent Office 2,731,576
Patented Jan. 17, 1956

2,731,576

6-PHASE, 2-CIRCUIT GENERATORS

John E. McElligott, Pasadena, Calif., assignor to General Electric Company, a corporation of New York Application October 18, 1954, Serial No. 462,693

12 Claims. (Cl. 310—202)

The present invention relates to dynamoelectric machines, and more particularly to a polyphase generator provided with a composite 6-phase armature winding with 2 circuits per pair of poles.

In the design of turbine-driven polyphase generators of large size, it is highly desirable to obtain a maximum output rating from a generator of given physical dimensions, and in order to achieve this objective various schemes have been suggested that bring about a reduction in voltage of the individual phases of the composite polyphase armature winding, so as to minimize the required insulation of the coil sides of the individual phases. To this end: considerable use has been made of 3-phase armature windings with 2 circuits per pair of poles, and some use has been made of 6-phase armature windings with 1 circuit per pair of poles.

Heretofore no attempt has been made to devise a 6-phase armature winding with 2 circuits per pair of poles, as it is immediately apparent that in a conventional symmetrical 6-phase armature winding, the provision of two circuits per pair of poles is impossible, since such a 6-phase armature winding with 2 circuits per pair of poles requires that there must be two phase belts assigned to each phase and disposed 180 electrical degrees apart; whereby, the "negative" phase belt for phase 1 would have to occupy the same space as the "positive" phase belt for phase 4, the "negative" phase belt for phase 2 would have to occupy the same space as the "positive" phase belt for phase 5, etc.

Accordingly, it is a general object of the present invention to provide in a polyphase generator, a composite 6-phase armature winding with 2 circuits per pair of poles, in which the phase belts are so arranged that there is obtained the two corresponding advantages with respect to the reduction in voltage of the individual phases thereof.

Another object of the invention is to provide a polyphase generator that supplies an asymmetrical 6-phase voltage consisting of two symmetrical 3-phase voltages having a phase angle displacement therebetween of approximately 30°.

A further object of the invention is to provide in a polyphase generator, an improved distribution and arrangement of the composite armature winding so that there is derived therefrom an asymmetrical 6-phase voltage consisting of well-balanced individual phase voltages having the sequential phase angles: 90°, 30°, 90°, 30°, 90° and 30°.

A further object of the invention is to provide an improved 6-phase power generating and 3-phase power distributing system incorporating a polyphase generator embodying the improved armature winding arrangement of the character noted.

Further features of the invention pertain to the particular arrangement of the elements of the polyphase generator and of the polyphase power system, whereby the above-outlined and additional operating featues thereof are attained.

The invention, both as to its organization and principle of operation, together with further objects and advantages thereof, will best be understood by reference to the following specification taken in connection with the accompanying drawings in which.

Figure 1:
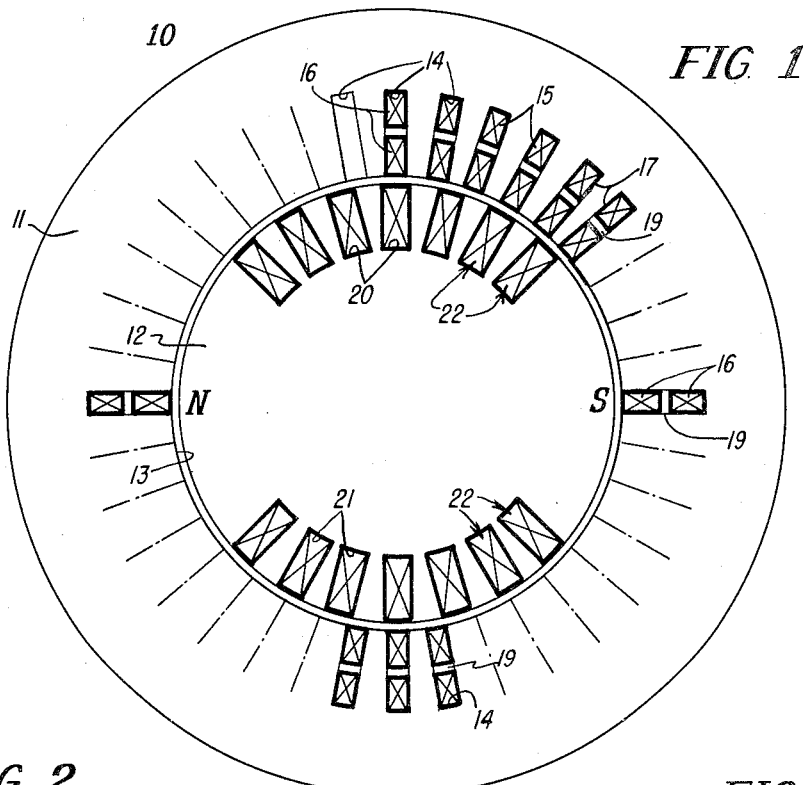
Figure 1 is a diagrammatic illustration of a 6-phase, 2-circuit generator of the 2-pole, cylindrical-rotor type embodying the present invention.

Referring now to Fig. 1 of the drawings, there is diagrammatically illustrated a large-size, turbine-driven, polyphase generator of the 6-phase, 2-circuit, 2-pole type, embodying the features of the present invention, and including a stationary armature element 11 and a cooperating rotatable field element 12. The armature element 11 is of elongated annular structure provided with an elongated substantially centrally disposed cylindrical opening 13 therethrough that is bounded by a number of angularly spaced-apart winding slots 14, thirty-six individual winding slots arranged in equally angularly spaced-apart relation being illustrated for the purpose of description. The armature element 11 carries a composite armature winding 15 of 6 phases with 2 circuits per pair of poles, including twelve individual phase windings, each including a number of series related coil sides 16, six coil sides being illustrated for the purpose of description. Two of the coil sides 16 may comprise a single conductor provided with an the top of each of the winding slots 14; and each of the coil sides 16 may comprise a single conductor provided wtih an enclosing insulating casing, indicated generally at 17, for the purpose of electrically isolating the conductor of the 16 and from the armature element 11, the armature element 11 being connected to reference ground, as indicated at 18. Each of the winding slots 14 not only receives the two coil sides 16, but it must accommodate cooling facility, essentially including a duct 19 through which air or other gas, or a liquid is forced, the arrangement of the duct 19 between the top and the bottom coil sides 16 in the winding slot 14 being entirely arbitrary for purpose of illustration. Of course, the coil sides 16 are mechanically blocked in place by a suitable wedge arrangement, not shown.

The field element 12 is provided with winding slots 20 and 21 on opposite sides thereof that receive a continuous field winding 22, that is mechanically blocked in place by a suitable wedge arrangement, not shown. When the field winding 22 is energized, it establishes a pair of oppositely disposed poles at the adjacent segmental surfaces thereof, as indicated by the reference characters N and S. Of course, when the field winding 22 is energized and the field element 12 is rotated, six phase voltages are induced in the phase windings of the composite armature winding 15, the frequency of the induced phase voltages being 60 cycles, when the field element 12 is rotated by the associated turbine at 3600 R. P. M.

Figure 2:
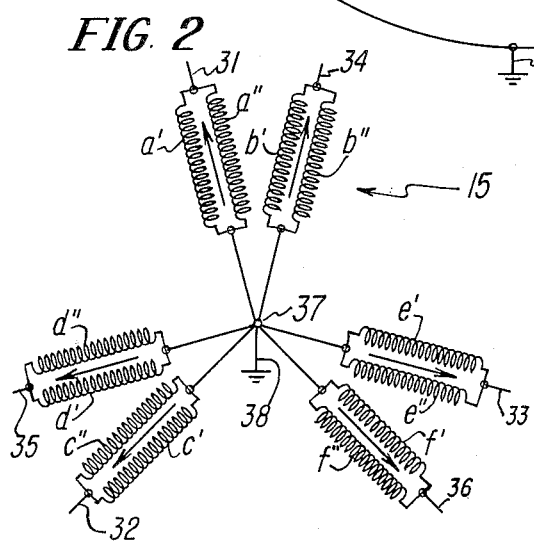
Fig. 2 is a schematic diagram of the composite 6-phase, 2-circuit armature winding incorporated in the generator of Fig. 1.

Referring now to Fig. 2, there are illustrated schematically the connections of the composite polyphase armature winding 15 of 6 phases with 2 circuits per pair of poles, and embodying the features of the present invention; the armature winding 15 including the six phase windings: $a'$, $d'$, $c'$, $f'$, $e'$ and $b'$ arranged in the first circuit, and the six phase windings: $a''$, $d''$, $c''$, $f''$, $e''$ and $b''$ arranged in the second circuit; whereby the phase "a" consists of the two parallel connected phase windings a' and a", the phase "b" consists of the two parallel connected phase windings b' and b", etc.

Figure 3:
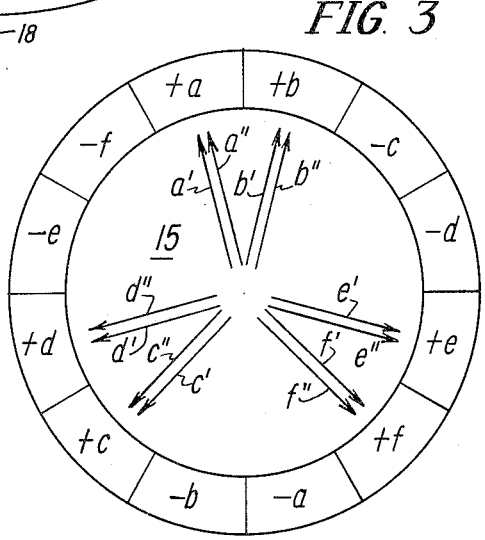
Fig. 3 is a combination vector diagram of the polyphase voltage and schematic diagram of the phase belt arrangement of the armature winding of Fig. 2.

Referring now to both Figs. 2 and 3, it will be appreciated that the terminals of the phase windings a", b", etc., in the second circuit are properly poled with respect to the terminals of the phase windings a', b', etc., in the coil side 16 from the conductor of the contiguous coil side first circuit, so that the phase voltages induced in the phase windings a' and a", b' and b", etc., are respectively in-phase with each other, and the phase voltages a' and a", b' and b", etc., are substantially equal to each other, so as to avoid circulating currents among the pairs of phase windings a' and a", etc., incident to parallel connection thereof to provide the composite armature winding 15 of 6 phases with 2 circuits per pair of poles. As illustrated in Fig. 2, the adjacent opposite ends of the paired phase windings a'—a", b'—b", etc., are strapped together to provide the output terminals 31, 32, 33, 34, 35 and 36 and to provide the common terminal 37 that is connected to reference ground, as indicated at 38. Moreover, as best illustrated in Fig. 3, the phase belts of the armature winding 15 are arranged in the electrical sequence: $+a$, $-f$, $-e$, $+d$, $+c$, $-a$, $+f$, $+e$, $-d$, $-c$ and $+b$; whereby the 6-phase voltage that is induced in the armature winding 15 is asymmetrical but consists of two symmetrical 3-phase voltages displaced by a phase angle of approximately 30°. Specifically, the phase angle displacements between the adjacent phase voltages are respectively: 90°, 30°, 90°, 30°, 90°, 30°, as shown in Fig. 3.

Figure 4:
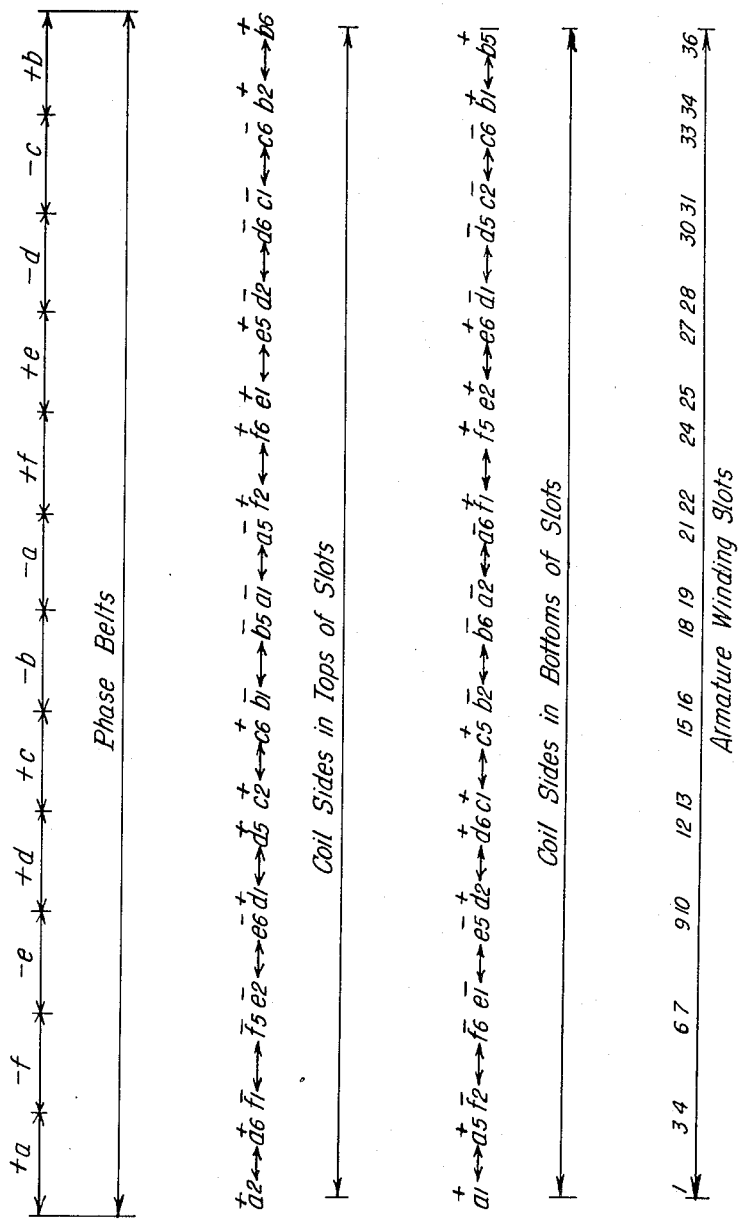
Fig. 4 is a schematic diagram of a distribution and slot arrangement of the armature winding of Fig. 2.

Referring to Fig. 4, the composite armature winding 15 may be distributed and of full pitch, as illustrated. The distribution of the coil sides of the various phase windings with respect to the tops and the bottoms of the thirty-six slots, as well as the arrangement of the armature slots in the armature element 11, are shown in detail in Fig. 4, and are considered to be self-explanatory. Specifically, the coil sides $+a1$, $+a3$ and $+a5$ are arranged in the bottoms of the respective winding slots 1, 2 and 3 in the $+a$ phase belt; while the $-a1$, $-a3$ and $-a5$ coil sides are arranged in the tops of the respective winding slots 19, 20 and 21 in the $-a$ phase belt; the coil sides $+a1$, $-a1$, $+a3$, $-a3$, $+a5$, and $-a5$ being connected in series relation in the first circuit in phase "a" to provide the phase winding a'. Similarly, the coil sides $+a2$, $+a4$ and $+a6$ are arranged in the tops of the respective winding slots 1, 2 and 3 in the $+a$ phase belt, while the $-a2$, $-a4$ and $-a6$ coil sides are arranged in the bottoms of the respective winding slots 19, 20 and 21 in the $-a$ phase belt; the coil sides $+a2$, $-a2$, $+a4$, $-a4$, $+a6$, and $-a6$ being connected in series relation in the second circuit in phase "a" to provide the phase winding a".

In view of the foregoing, it will be understood that the coil sides of the phase windings f' and f", the phase windings e' and e", etc., are arranged in the corresponding adjacent winding slots in the armature element 11 in the manner illustrated.

Thus it will be understood that with a given output rating of the generator 10, a considerable reduction in the phase voltage is realized, firstly, by the provision of the six phases in the composite armature winding 15, and secondly, by the provision of the two parallel circuits therein; whereby the required thickness of the insulation of the casings 17 enclosing the conductors of the coil sides 16 may be substantially reduced, rendering available additional space in the winding slots 14, so that this additional space may be used for various additional design purposes. For example, the cross-sectional area of the conductors of the coil sides 16 may be increased. On the other hand, the dimensions of the winding slots 14 may be reduced in order correspondingly to increase the dimensions of the interposed armature teeth to relieve saturation thereof, etc. Recapitulating, by reducing the required thickness of the insulation of the casings 17 of the coil sides 16, the additional space in the winding slots 14 is rendered available for utilization in design factors effecting an increased rating of the generator 10, without increasing the physical dimensions thereof; whereby the generator, when embodying the improved armature winding 15 may be rated at a higher power output than when it embodies a conventional armature winding of 6 phases with 1 circuit per pair of poles or of 3 phases with 2 circuits per pair of poles.

Figure 5:
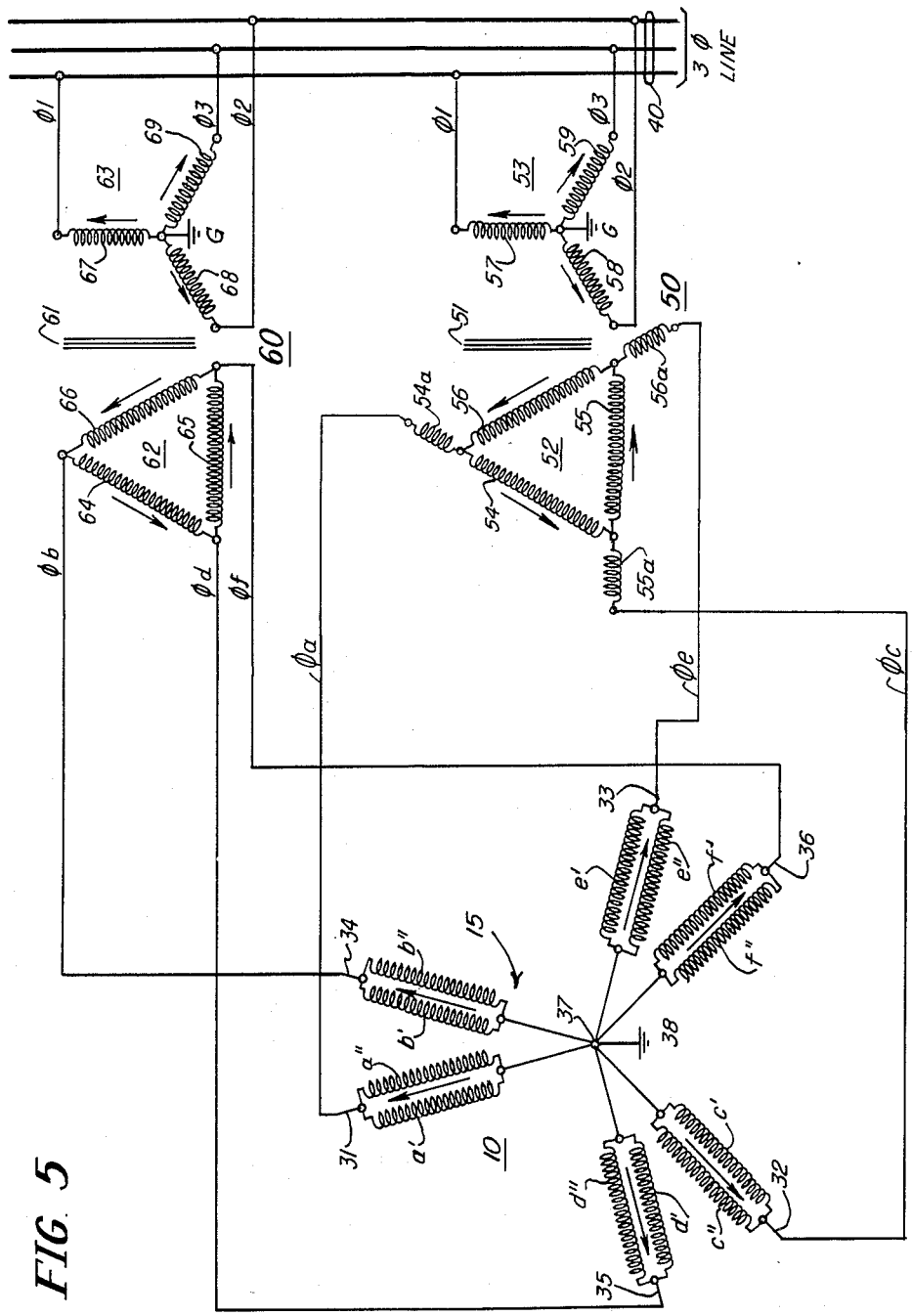
Fig. 5 is a schematic diagram of a 6-phase power generating and 3-phase power distributing system incorporating the polyphase generator of Fig. 1 provided with the armature winding of Fig. 2 and embodying the present invention.

Now since the improved armature winding 15 is productive of an asymmetrical 6-phase voltage, a phase-correcting network must be arranged between the generator 10 and a conventional 3-phase supply line in order to provide a power distributing system. Referring more particularly to Fig. 5, the generator 10, embodying the composite armature winding 15 is illustrated in conjunction with a phase-correcting network and a 3-phase supply line 40, which phase-correcting network includes a 3-phase transformer device 50 of the extended delta type; and also, the system includes a 3-phase step-up transformer 60. More particularly, the transformer device 50 comprises core elements, indicated generally at 51, carrying primary and secondary windings 52 and 53. The primary winding 52 includes three delta-connected phase windings 54, 55 and 56 respectively provided with delta-extending phase windings 54a, 55a and 56a; while the secondary winding 53 includes three Y-connected phase-windings 57, 58 and 59, the center of the Y being connected to reference ground, as indicated at G. Similarly, the step-up transformer 60 comprises core elements, indicated generally at 61, carrying primary and secondary windings 62 and 63; the primary winding 62 including three delta-connected phase windings 64, 65 and 66, and the secondary winding 63 including three Y-connected phase windings 67, 68 and 69, the center of the Y being connected to reference ground, as indicated at G.

In the arrangement, the three output terminals 31, 32 and 33 of the leading 3-phase voltage supply of the generator 10 are respectively connected to the three outside terminals of the primary winding 52 of the transformer device 50; and the three terminals of the secondary winding 53 of the transformer device 50 are respectively connected to the three conductors of the supply line 40. On the other hand, the three output terminals 34, 35 and 36 of the lagging 3-phase voltage supply of the generator 10 are respectively connected to the three terminals of the primary winding 62 of the step-up transformer 60; and the three terminals of the secondary winding 63 of the step-up transformer 60 are respectively connected to the three conductors of the supply line 40.

In the operation of the polyphase power supply system, it will be understood that the arrangement of the primary winding 52 of the transformer device 50 effects a rearward phase-shift of approximately 30° between the outside terminals thereof (connected to the leading 3-phase voltage supply of the generator 10) and the inside terminals thereof (at which the primary phase windings 54, 55 and 56 are delta-connected); whereby the two 3-phase voltages respectively induced in the secondary windings 53 and 63 of the respective transformer device 50 and the step-up transformer 60 are in-phase with each other so that they may supply in parallel relation the two 3-phase output voltages to the supply line 40.

By proper design of the transformer device 50, it will be understood that the phase-shift in the rearward direction between the outside terminals and the inside terminals of the primary winding 52 thereof may be made exactly 30°; and by proper design of the step-up transformer 60, the 3-phase output voltage of the secondary winding 63 thereof may be made exactly equal and balanced with respect to that of the secondary winding 53 of the transformer device 50, for equal division of the load therebetween that is supplied to the 3-phase line 40.

In view of the foregoing, it is apparent that there has been provided in a polyphase generator, an improved armature winding arrangement of 6 phases with 2 circuits per pair of poles that is effective substantially to increase the power output of the generator and that is exceedingly flexible with reference to other generator design factors, together with an improved 6-phase power generating and 3-phase power distributing system incorporating the generator noted.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a 6-phase generator including an armature element, a composite armature winding of 6 phases with 2 circuits per pair of poles carried by said armature element and including three individual first circuit odd phase windings ($a'$, $c'$ and $e'$) and three individual first circuit even phase windings ($b'$, $d'$ and $f'$) and three individual second circuit odd phase windings ($a''$, $c''$ and $e''$) and three individual second circuit even phase windings ($b''$, $d''$ and $f''$), said phase windings being arranged in the electrical sequence: ($a'$ and $a''$, $d'$ and $d''$, $c'$ and $c''$, $f'$ and $f''$, $e'$ and $e''$, $b'$ and $b''$), and means connecting said six individual first circuit phase windings ($a'$, $d'$, $c'$, $f'$, $e'$ and $b'$) in parallel relation with the respectively corresponding ones of said six individual second circuit phase windings ($a''$, $d''$, $c''$, $f''$, $e''$ and $b''$) to produce the corresponding composite phases ($a$, $d$, $c$, $f$, $e$ and $b$), wherein each of the corresponding individual odd phase angles ($a$–$c$, $c$–$e$ and $e$–$a$) is substantially 120° and each of the corresponding individual even phase angles ($b$–$d$, $d$–$f$ and $f$–$b$) is substantially 120° and each of the corresponding individual even to odd phase angles ($b$–$a$, $d$–$c$ and $f$–$e$) is substantially 30°.

2. The 6-phase generator set forth in claim 1, wherein said composite armature winding is distributed in twelve corresponding individual substantially equally angularly spaced-apart arcuate phase belts per pair of poles disposed in the electrical sequence: ($+a$, $-f$, $-e$, $+d$, $+c$, $-b$, $-a$, $+f$, $+e$, $-d$, $-c$, $+b$), wherein said individual phase windings ($a'$ and $a''$) are arranged in said individual phase belts ($+a$ and $-a$), said individual phase windings ($b'$ and $b''$) are arranged in said individual phase belts ($+b$ and $-b$), etc.

3. The 6-phase generator set forth in claim 2, wherein each of said phase belts comprises N substantially equally angularly spaced-apart winding slots provided in said armature element, where N is an integer.

4. The 6-phase generator set forth in claim 3, wherein each of said phase windings comprises 2N series-related coil sides, each of said winding slots receives two of said coil sides respectively in the top and in the bottom thereof, the odd and even coil sides of said individual phase winding ($a'$) are respectively arranged in said corresponding individual phase belts ($+a$ and $-a$) and the odd and even coil sides of said individual phase winding ($a''$) are respectively arranged in said corresponding individual phase belts ($-a$ and $+a$), etc.

5. The 6-phase generator set forth in claim 4, wherein the odd and even coil sides of each of said phase windings are respectively arranged in the tops and the bottoms of the winding slots in the two corresponding phase belts.

6. In a combination, a 6-phase generator provided with a first set of three supply terminals and a second set of three supply terminals and operative to generate an asymmetrical 6-phase supply voltage including a first symmetrical 3-phase supply voltage applied to said first set of supply terminals and a second symmetrical 3-phase supply voltage applied to said second set of supply terminals with a fixed phase angle in a given direction between said first 3-phase supply voltage and said second 3-phase supply voltage, a 3-phase device provided with a set of three input terminals and a set of three output terminals and operative in response to the application of a 3-phase input voltage to said set of input terminals to produce a 3-phase output voltage applied to said set of output terminals with a phase shift between said 3-phase input voltage and said 3-phase output voltage through said fixed phase angle in a direction opposite to said given direction, connections between said first set of supply terminals and said set of input terminals, whereby said 3-phase output voltage applied to said set of output terminals and said second 3-phase supply voltage applied to said second set of supply terminals are in-phase with respect to each other, and a 3-phase load circuit commonly supplied from said second set of supply terminals and said set of output terminals.

7. The combination set forth in claim 6, wherein said given direction is the leading direction.

8. The combination set forth in claim 6, wherein said generator consists essentially of a dynamoelectric machine including an armature winding of 6 phases with 2 circuits per pair of poles.

9. The combination set forth in claim 6, wherein said 3-phase device consists essentially of transformer apparatus provided with extended-delta-connected windings.

10. In a 6-phase generator including an armature element, a composite 2-pole 6-phase 2-circuit armature winding carried by said armature element and including twelve individual phase windings, said twelve individual phase windings being arranged in two equivalent groups of six individual phase windings each, a ground connection common to said armature element and to the inside ends of the six individual phase windings in one of said groups and to the outside ends of the six individual phase windings in the other of said groups, six supply terminals, first connections between the outside ends of the six individual phase windings in said one group and respective ones of said six supply terminals to provide one of said 6-phase circuits, and second connections between the inside ends of the six individual phase windings in said other group and respective ones of said six supply terminals to provide the other of said 6-phase circuits, whereby said two 6-phase circuits are connected in parallel relation to provide a composite 6-phase supply voltage at said six supply terminals, said two groups of phase windings being so connected and arranged that said composite 6-phase supply voltage is asymmetrical and is composed of two symmetrical 3-phase supply voltages with a phase angle of substantially 30° between said two 3-phase supply voltages.

11. In a polyphase generator, a composite 6-phase armature winding provided with 2 circuits per pair of poles and comprising the sequential phase belts: ($+a$, $-f$, $-e$, $+d$, $+c$, $-b$, $-a$, $+f$, $+e$, $-d$, $-c$ and $+b$); wherein the two phase belts of each of said pairs: ($+a$ and $-a$, etc.) are disposed substantially 180 electrical degrees apart and consists of a pair of individual phase windings connected in parallel relation.

12. In a polyphase generator, a composite 6-phase armature winding provided with 2 circuits per pair of poles, wherein each of said phases consists of a pair of individual phase windings connected in parallel relation, said pairs of individual phase windings being so distributed and arranged that an asymmetrical 6-phase voltage is induced in said composite armature winding that consists of two symmetrical 3-phase voltages having a phase angle displacement therebetween of approximately 30°.

References Cited in the file of this patent

UNITED STATES PATENTS

| | | |
|---|---|---|
| 1,447,164 | Hague | Feb. 27, 1923 |
| 2,196,886 | Adams | Apr. 9, 1940 |